Oct. 7, 1952
J. T. LEONARD
2,612,967
MEASURING VALVE FOR CENTRALIZED LUBRICATING SYSTEMS
Filed June 21, 1949
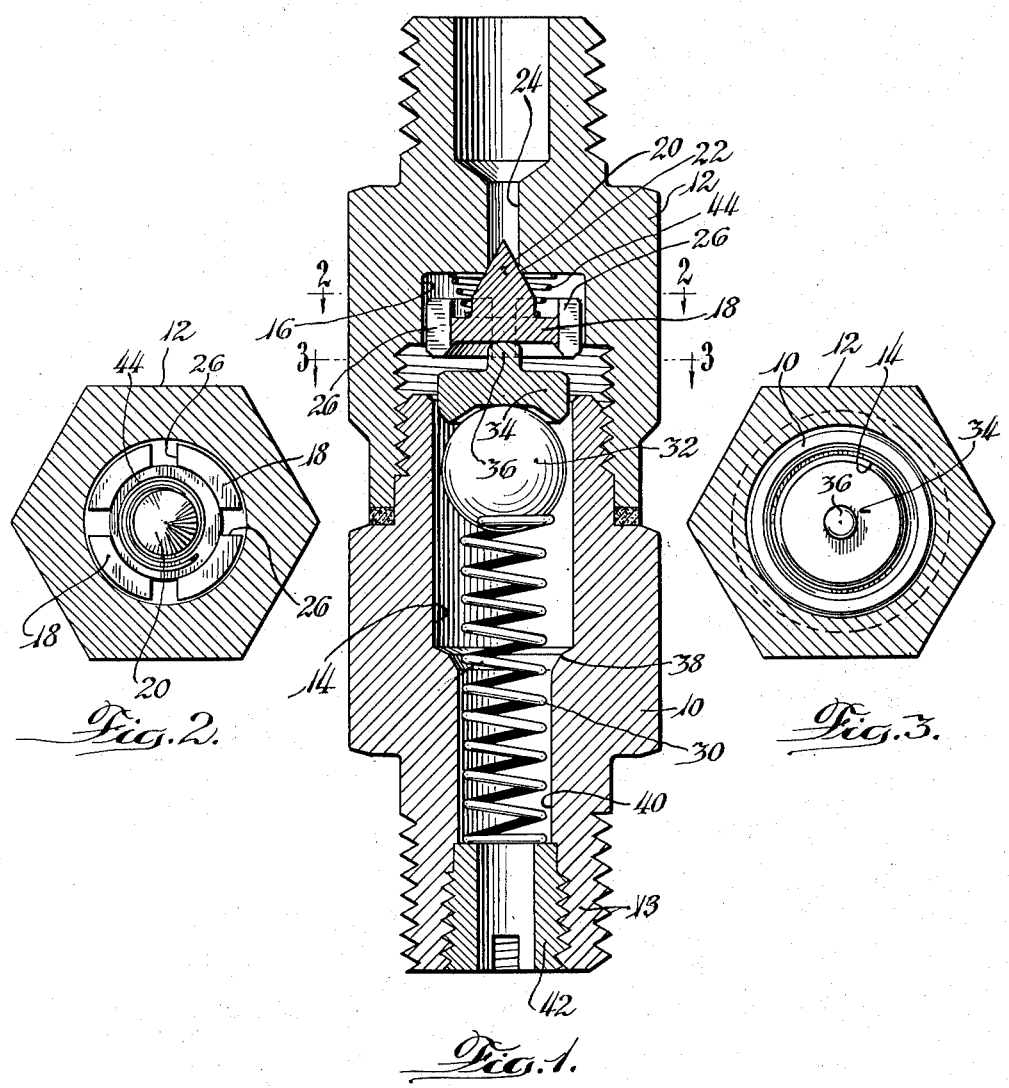
Inventor:
John T. Leonard
By Hinkle, Horton, Ahlberg, Hansmann & Wupper
Attorneys.

Patented Oct. 7, 1952

2,612,967

UNITED STATES PATENT OFFICE 2,612,967

MEASURING VALVE FOR CENTRALIZED LUBRICATING SYSTEMS

John T. Leonard, Evanston, Ill.

Application June 21, 1949, Serial No. 100,423

2 Claims. (Cl. 184—7)

My invention relates generally to measuring valves usable in centralized lubricating systems, and more particularly to the poppet valve type of measuring valve in which the charge is measured and supplied to the part to be lubricated in response to alternating increase and relief of the pressure on the lubricant supplied to the measuring valve.

It is an object of my invention to provide an improved simplified measuring valve which may be economically manufactured, in which the requirements for precision in manufacture are not severe, and which will operate satisfactorily in any position in which it may be installed.

Other objects will appear from the following description, reference being had to the accompanying drawings, in which:

Fig. 1 is an enlarged diametrical sectional view of the improved measuring valve; and Figs. 2 and 3 are transverse sectional views thereof, taken on the lines 2—2 and 3—3, respectively, of Fig. 1.

The valve comprises a casing comprising a body part 10 and a cap part 12, which are threaded together. The lower part of the body 10 has a threaded shank 13 for application to a part to be supplied with measured charges of lubricant, and has a cylindrical bore 14 formed in the upper end thereof. The cap 12 has a chamber 16 formed therein for the reception of a poppet valve 18, the valve having a conical portion 20 normally engaging a valve seat 22, which is preferably swaged at the juncture of an inlet passageway 24 with the valve chamber 16. The upper end of the cap part 12 is threaded for attachment to a conduit system which is supplied with lubricant from a suitable source, and in which the pressure is periodically increased and relieved. It will be understood that the measuring valve shown in the drawings is representative of any desired number of such valves which may be connected to a single conduit system.

The valve 18 fits rather loosely within the chamber 16, and in addition has a plurality of slots 26 to permit flow of lubricant past it. The valve is normally held against its seat 22 by a compressed coil spring 30, which presses a ball valve 32 against a piston 34, the latter having a central projection 36 on its upper surface, which is engageable with the lower surface of the valve 18.

The piston 34 has a free sliding fit in the cylinder 14, the clearance between the piston and the wall of the cylinder being sufficient to permit bypass of lubricant past the piston 34. The ball valve 32 is of substantially lesser diameter than that of the cylinder 14, and may be slightly smaller in diameter than the piston 34, and is adapted to engage and seal against a knife-edged seat 38 which is swaged at the lower end of the cylinder 14, where it joins the reduced diameter outlet passageway 40. The lower end of the compression coil spring 30 rests upon a hollow bushing 42 threaded in the lower end of the shank of the body 10.

A conical spring 44 is compressed between the end of the valve chamber 16 and the valve 18. This spring is relatively weak but of strength sufficient adequately to overcome the force of gravity acting upon valve 18 when the measuring valve is inverted relative to the position in which it is shown in Fig. 1.

In operation, as previously stated, lubricant is supplied under high pressure and relieved intermittently. Assuming that the measuring valve has previously been filled with lubricant, the force of the spring 30 acting upon the relatively small effective cross sectional area of the valve 18 will hold the latter against its seat 20 until a relatively high pressure is built up in the inlet passageway 24. When such high pressure has been built up, the valve 18 snaps rapidly from its seat and lubricant flowing through the valve chamber and acting upon the upper surface of the piston 34, which is obviously many times greater in area than the valve seat 22, forces the piston 34 and ball valve 32 rapidly downwardly, compressing the spring 30 until the ball 32 seats against the swaged knife-edged seat 38.

It will be understood that although the clearance between the piston 34 and cylinder 18 is substantial, it is sufficiently small so that substantially the full pressure difference between that on the opposite sides of the piston 34 is maintained, and as a result, lubricant within the cylinder 14 is discharged to the part to be lubricated as the piston 34 and ball valve 32 are forced downwardly. When the valve 32 has engaged its seat 38, it is retained in this position by the lubricant pressure within the cylinder 14 until the pressure in the conduit system is relieved. Upon such relief in pressure, the spring 30 forces the piston 34 and ball 32 upwardly, thereby increasing the pressure on the lower surface of the valve 18. While there is substantial clearance around the valve 18, and additional lubricant flow passageways are provided by the slots 26, the valve 20 is of relatively light weight, and the spring 26 relatively weak, so that the differential pressure on the opposite sides of the valve 18 will be sufficient to force its conical portion 20 to seal against the seat 22 almost immediately upon the commencement of the return stroke of the piston 34.

It will be understood that the valve 18 is always retained close to its seat by virtue of the fact that its diameter is greater than that of the cylinder 14, and thus it will, during the discharge stroke of the valve, be forced against the upper end of the body part 10. Thus lubricant above the piston 34 will, as the piston moves upwardly, be forced to bypass the piston into the portion of the cylinder 14 below the piston, thereby recharging the cylinder 14 with lubricant for the next cycle of operation.

The fact that the ball valve 32 presses against the piston 34 at a point near its center, and similarly, that the projection 36 of the piston engages the valve 18 substantially along its axis, causes the conical portion 20 of the valve to be pressed against its seat 22 and automatically to center itself with reference to the valve seat, since the piston 34 provides an articulated force transmitting connection between the ball 32 and valve 18, so that the latter may shift to a limited extent in any direction to enable it to center itself with respect to the seat 22.

If the valve is installed upon a machine in a position inverted relative to the position in which it is shown in Fig. 1, during the period of pressure application the weight of the valve 18, if a spring 44 were not provided, might cause the valve to seat after the ball valve 32 sealed against its seat 38, and lubricant under pressure might thus be locked within the cylinder 14 if, as is desired, the valves 18 and 32 sealed perfectly against their respective seats. While it is generally stated that oil and grease are incompressible, it may have a limited degree of elasticity due to the entrapment of small amounts of air. Thus, lubricant would remain compressed between the two seated valves and lock the measuring valve against further operation. This possibility is avoided by providing the weak valve return spring 44 which prevents the valve 18 from seating when subjected only to the force of gravity. It can therefore seat only after the valve 32 and piston 34 have commenced moving under the force of the spring 30, so as to create a substantial difference in pressure upon the opposite sides of the valve 18.

It will be understood that if the lubricant to be used with the measuring valve is of very low viscosity, the clearance between the piston 34 and the walls of the cylinder 14 should be very small, whereas if a high viscosity oil, or grease, is used in the lubricating system, this clearance may be substantially greater. However, the dimensions of the parts are not over critical, and the parts may therefore be made by ordinary machining processes, without requiring that they be made to tolerances of a precision nature. The measuring valve may therefore be manufactured at a relatively low cost. Since the valve 18 is a very small part (it is shown approximately four times normal size in the drawing), it may be economically made by the pressed powdered metal technique.

The discharge capacity of the measuring valve may be varied readily by substituting pistons 34 of different axial dimensions, since it will be apparent that the amount of lubricant discharged upon each operation of the valve is that which is located within the cylinder 14 below the lower surface of the piston 34. Since such lengthening of the piston to secure a decreased discharge would change the effective force of the spring 30, it is desirable, when substituting a piston of increased length, that a spring 30 of correspondingly decreased length be used.

The piston 34 is of advantage in improving the operation of the valve, but it may be omitted, if desired, in which case the ball valve 32 would bear directly against the valve 18.

While I have shown and described a preferred embodiment of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. A measuring valve for use in a centralized lubricating system, comprising a casing having an inlet for connection to a source of lubricant which is intermittently placed under pressure and having an outlet for connection to a part to be supplied intermittently with measured charges of lubricant, said casing having a bore forming a cylinder, an inlet valve seat between the inlet and the cylinder, an outlet valve seat between the cylinder and the outlet, an outlet valve guided for reciprocatory movement in the cylinder, an inlet valve cooperable with the inlet valve seat, means limiting the extent of movement of the inlet valve from its seat, a spring acting in a direction to hold the inlet valve away from its seat, said spring exerting a force on said valve only slightly greater than the weight of the valve, a piston reciprocable in the cylinder, the piston and cylinder providing a restricted bypass around the piston, and a spring compressed between the casing and the outlet valve and normally pressing the inlet valve against its seat by a force transmitted substantially axially through the outlet valve, the piston, and the inlet valve.

2. A measuring valve for use in a centralized lubricating system, comprising a casing having an inlet for connection to a source of lubricant which is intermittently placed under pressure and having an outlet for connection to a part to be supplied intermittently with measured charges of lubricant, said casing having a bore forming a cylinder, a relatively small diameter inlet valve seat between the inlet and the cylinder, a relatively large diameter outlet valve seat between the cylinder and the outlet, an outlet valve guided for reciprocatory movement in the cylinder, an inlet valve cooperable with the inlet valve seat and having a portion of transverse cross-sectional area substantially greater than that of the seat, means limiting the extent of movement of the inlet valve from its seat, a piston reciprocable in the cylinder and having a central projection for engagement with the inlet valve, the piston and cylinder providing a restricted by-pass around the piston, a strong spring compressed between the casing and the outlet valve, normally pressing the inlet valve against its seat by a force transmitted substantially axially through the outlet valve, the piston, and the inlet valve, and a relatively weak spring compressed between the inlet valve and the casing to move the inlet valve away from its seat when the same is not being held against its seat by the strong spring.

JOHN T. LEONARD.

REFERENCES CITED

The following references are of record in the file of this patent:

UNITED STATES PATENTS

| Number | Name | Date |
|---|---|---|
| 1,803,601 | Davis | May 5, 1931 |
| 1,830,374 | Serpas | Nov. 3, 1931 |
| 1,877,124 | Cutts | Sept. 13, 1932 |
| 1,924,674 | Zerk | Aug. 29, 1933 |
| 2,029,198 | Ross | Jan. 28, 1936 |
| 2,232,620 | Meeks | Feb. 18, 1941 |
| 2,308,865 | Davis | Jan. 19, 1943 |
| 2,532,269 | Davis | Nov. 28, 1950 |

FOREIGN PATENTS

| Number | Country | Date |
|---|---|---|
| 284,492 | Great Britain | Feb. 2, 1928 |
| 348,961 | Great Britain | May 21, 1931 |